United States Patent
Park (10) Patent No.: US 7,627,194 B2
(45) Date of Patent: Dec. 1, 2009

(54) METHOD AND DEVICE FOR MAKING VIRTUAL IMAGE REGION FOR MOTION ESTIMATION AND COMPENSATION OF PANORAMA IMAGE

(75) Inventor: Gwang-Hoon Park, Seongnam-si (KR)

(73) Assignees: Samsung Electronics Co., Ltd., Suwon-si (KR); Industry Academic Cooperation Foundation Kyunghee University, Youngin-si (KR)

( * ) Notice: Subject to any disclaimer, the term of this patent is extended or adjusted under 35 U.S.C. 154(b) by 565 days.

(21) Appl. No.: 11/202,090

(22) Filed: Aug. 12, 2005

(65) Prior Publication Data

US 2006/0034530 A1 Feb. 16, 2006

(30) Foreign Application Priority Data

Aug. 13, 2004 (KR) ............... 10-2004-0063891
Aug. 9, 2005 (KR) ............... 10-2005-0072969

(51) Int. Cl.
*G06K 9/36* (2006.01)
*H04N 7/00* (2006.01)

(52) U.S. Cl. ................................. 382/276; 348/36

(58) Field of Classification Search ............... 382/103, 382/236, 251, 276, 284, 305; 348/27, 36, 348/208.4; 375/240.03, 240.16; 386/46
See application file for complete search history.

(56) References Cited

U.S. PATENT DOCUMENTS

| | | | |
|---|---|---|---|
| 5,421,589 A * | 6/1995 | Monroe | ............ 345/9 |
| 6,014,671 A | 1/2000 | Castelli et al. | |
| 6,026,195 A * | 2/2000 | Eifrig et al. | ............ 382/236 |
| 6,101,276 A * | 8/2000 | Adiletta et al. | ............ 382/236 |
| 6,121,970 A | 9/2000 | Guedalia | |
| 6,157,747 A | 12/2000 | Szeliski et al. | |
| 6,192,393 B1 | 2/2001 | Tarantino et al. | |
| 6,272,235 B1 | 8/2001 | Bacus et al. | |
| 6,937,266 B2 * | 8/2005 | Rui et al. | ............ 348/14.05 |

FOREIGN PATENT DOCUMENTS

| | | |
|---|---|---|
| EP | 1 286 308 A1 | 2/2003 |
| KR | 10-2002-0007945 A | 1/2002 |

* cited by examiner

*Primary Examiner*—Kanji Patel
(74) *Attorney, Agent, or Firm*—Roylance, Abrams, Berdo and Goodman, LLP

(57) ABSTRACT

A method of and apparatus for setting a virtual image region is provided in order to efficiently perform motion estimation and compensation of a panorama image including 360-degree omni-direction image information. The method includes the steps of searching a previous panorama image for reference data corresponding to all or part of a virtual image region of a current patch desired to be motion-estimated in order to determine the presence of the reference data, and selectively mapping the reference data to all or part of the virtual image region. By doing so, the panorama image containing omni-directional image information is coded by using a 2-dimensional moving picture coding method without change, while the coding efficiency in the process of motion estimation and compensation can be greatly improved.

22 Claims, 10 Drawing Sheets

METHOD AND DEVICE FOR MAKING VIRTUAL IMAGE REGION FOR MOTION ESTIMATION AND COMPENSATION OF PANORAMA IMAGE

CROSS-REFERENCE TO RELATED PATENT APPLICATIONS

This application claims the benefit under 35 U.S.C. §119 (a) of Korean Patent Application No. 10-2004-0063891, filed in the Korean Intellectual Property Office on Aug. 13, 2004, and Korean Patent Application No. 10-2005-0072969, filed in the Korean Intellectual Property Office on Aug. 9, 2005, the entire disclosures of which are incorporated herein by reference.

BACKGROUND OF THE INVENTION

1. Field of the Invention

The present invention relates to motion estimation and compensation. More particularly, the present invention relates to a method of and apparatus for setting a virtual image region in order to efficiently perform motion estimation and compensation of a panorama image including 360-degree omni-direction image information.

2. Description of the Related Art

An omni-directional video camera system is a camera system that is capable of taking 360-degree omni-directional images from a fixed viewpoint. The omni-directional video camera system takes omni-directional images by mounting and using a special shape mirror such as a hyperboloid mirror, a special lens such as a fish eye lens, or by using a plurality of cameras.

A 3-dimensional realistic broadcasting system is presented as an example of an omni-directional video coding application for use with such a system. In the 3-dimensional realistic broadcasting system, all image information on views from various viewpoints in a baseball game and the like for example, is provided to viewers' terminals. That is, a variety of image information items, including the view from the pitcher, the view from the catcher, the view from the batter, and the view from the audience sitting near first base, are provided to the viewers. Viewers can select a desired viewpoint and view the image from the viewpoint.

An image photographed by the omni-directional camera system has a characteristic corresponding to a 3-dimensional spherical environment. Accordingly, a 3-dimensional image taken by the omni-directional camera system is converted into a 2-dimensional plane image. At this time, the 2-dimensional plane image becomes a panorama image including the omni-directional image, and omni-directional video coding is performed for the 2-dimensional panorama image.

Generally, this panorama image has a size much larger than that of the conventional 2-dimensional image, and in order to transmit a quality image, uses an excessively wide bandwidth. In an omni-directional image, a user is typically not interested in all image parts obtained by the omni-directional camera at the same time, but wants to view only a part of interest in detail by freely manipulating user's viewpoints based on information on the entire image. Accordingly, a codec capable of transmitting an image with a minimum transmission bandwidth to a receiving end is needed, wherein the image is of interest to the current user. In this regard, a method of dividing a panorama image into tiled patches and transmitting the image has been suggested.

Figure 1:
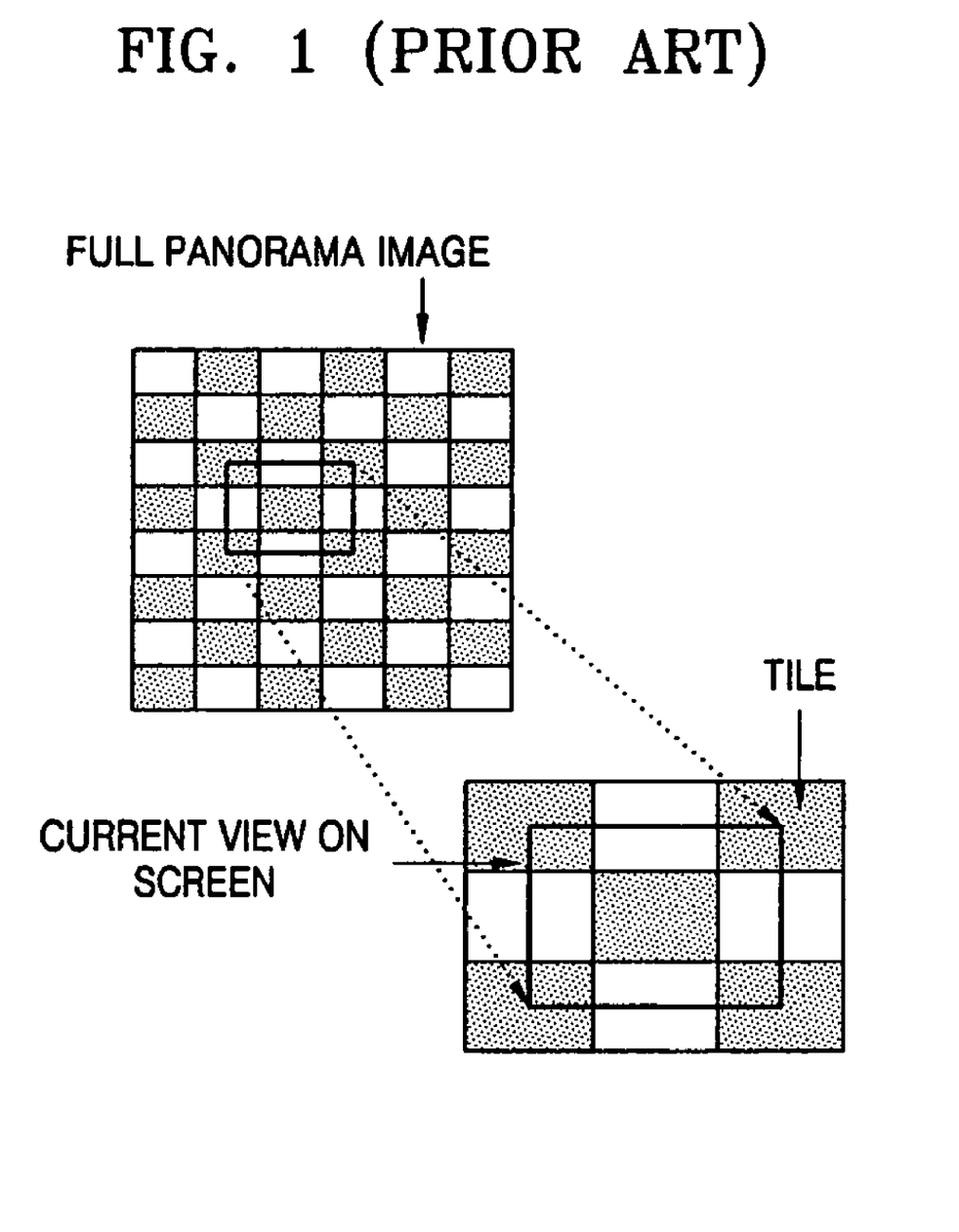
FIG. 1 illustrates a conventional method of dividing a panorama image into tiled patches and transmitting the image.

FIG. 1 illustrates a method of dividing a panorama image into tiled patches and transmitting the image.

In this method, an encoded panorama image is divided into patches of small tiles and stored, and then, on the request of a user, some patches centered on a part to be shown by the request are transmitted to a decoder side. According to this method, the entire panorama image is not transmitted to the decoder side at one time, but is divided into tiled patches and transmitted such that the size of the data transmitted and the transmission bandwidth are greatly reduced, and the initial delay required for transmitting all image information is prevented. Also, the surrounding part of the area of interest being currently seen by the request of the user is transmitted and received together, such that the user can easily change viewpoints.

Figure 2:
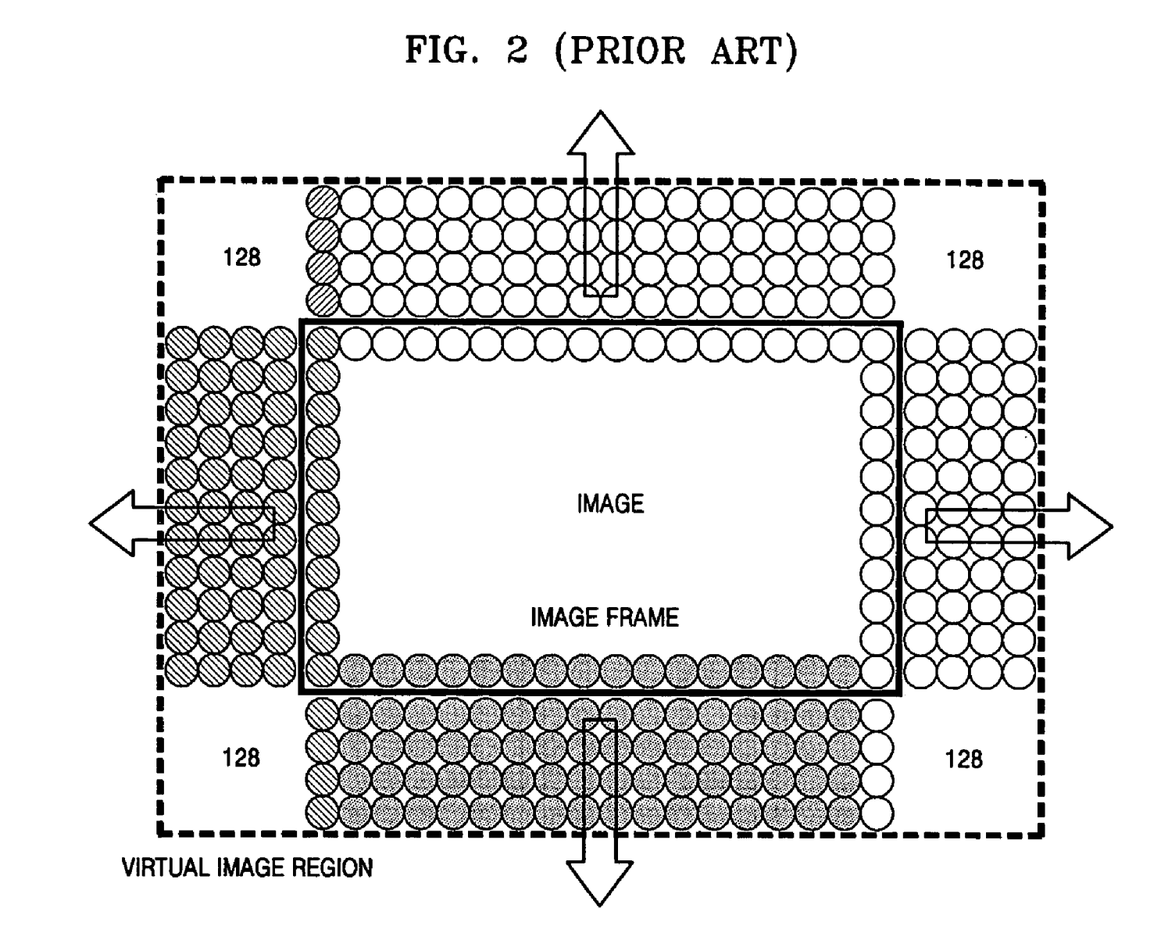
FIG. 2 illustrates a conventional method of forming a virtual image region by using padding.

In order to transmit the tiled patches to the decoder side, a transmission and reception method using the conventional 2-dimensional moving picture coding techniques without change has been suggested. Techniques such as MPEG-4 Part 2 Visual or H.264 are examples of conventional 2-dimensional moving picture coding techniques being used. As shown in FIG. 2, according to the conventional technology, in order to enhance efficiency when motion estimation or compensation is performed along the boundary of a reference image frame, an unrestricted motion vector (UMV) mode is prepared and a virtual image region is disposed. Then, by padding pixel values of the boundary part below, above, left and right of the frame, motion estimation of a current image is performed. Since any image data other than an image frame to be transmitted cannot be referred to in the 2-dimensional moving picture processing technique, this method is used to obtain high efficiency in the situation. However, in order to encode a large panorama image, an image frame of small-tile-shaped patch units is encoded, and reference images can exist with respect to the position of each patch.

Accordingly, a need exists for a system and method for encoding images more efficiently by using reference images that can exist with respect to the position of each patch, as the conventional moving picture coding methods are not appropriate.

SUMMARY OF THE INVENTION

The present invention substantially solves the above and other problems, and provides a method of and apparatus for generating a virtual image region for motion estimation and compensation of a panorama image that is divided into tile-shaped patch units that are transmitted and received, wherein pixels of a reference image frame boundary part are not padded outside the frame unconditionally. When actual image data belonging to the virtual image region exists in the previous panorama image, the method and apparatus uses the data without change to generate a virtual image region.

According to an aspect of the present invention, a method is provided for generating a virtual image region for motion estimation of a panorama image to be divided into tiled patch units and transmitted from a transmitting side, the method comprising the steps of searching a previous panorama image for reference data corresponding to all or part of a virtual image region of a current patch desired to be motion-estimated in order to determine the presence of the reference data and retrieving such reference data if found, and based on the retrieval result, selectively mapping the reference data to all or part of the virtual image region.

The step of mapping the reference data may comprise the steps of, where the result of the retrieval indicates that there is reference data, judging whether or not the reference data was updated within a predetermined time, and if the result of the judging indicates that the reference data was updated within a predetermined time, mapping the reference data to all or part of the virtual image region.

Here, if the result of the judging indicates that the reference data was not updated within the predetermined time, it may be determined whether mapping the reference data to all or part of the virtual image region is to be performed, or if padding pixels on the boundary part of a reference image in the previous panorama image corresponding to the position of the current patch is to be performed, and according to the determination, mapping or padding may be performed.

The method may further comprise the steps of recording information on the determination in order to transmit additional information allowing a receiving side to also generate substantially identically all or part of a virtual image region for the patch.

Also, if the result of the retrieval indicates that there is no reference data, all or part of the virtual image region may be generated by padding pixels on the boundary part of a reference image in the previous panorama image corresponding to the position of the current patch.

Also, if all or part of the virtual image region is outside any one of the left boundary and the right boundary of the previous panorama image, an image from the other boundary to a predetermined range may be recognized as reference data for a virtual image region part existing outside the one boundary.

According to another aspect of the present invention, an apparatus is provided for generating a virtual image region for motion estimation of a panorama image to be divided into tiled patch units and transmitted from a transmitting side, the apparatus comprising a retrieval unit for searching a previous panorama image for reference data corresponding to all or part of a virtual image region of a current patch desired to be motion-estimated in order to determine the presence of the reference data and retrieving such reference data if found, a judging unit for judging whether or not the reference data was updated within a predetermined time if the retrieval result of the retrieval unit indicates that there is reference data, a mapping unit for selectively mapping the reference data to all or part of the virtual image region if the result of the judging indicates that the reference data was updated within the predetermined time, a determination unit for determining whether mapping or padding is to be performed if the result of the judging indicates that the reference data was not updated within the predetermined time, and a padding unit for generating all or part of the virtual image region by padding pixels on the boundary part of a reference image in the previous panorama image corresponding to the position of the current patch if the result of the retrieval indicates that there is no reference data.

According to still another aspect of the present invention, a method is provided for generating a virtual image region for motion compensation of a panorama image divided into tiled patch units and received at a receiving side, the method comprising the steps of searching a previous panorama image for reference data corresponding to all or part of a virtual image region of a current patch desired to be motion-compensated in order to determine the presence of the reference data and retrieving such reference data if found, and based on the retrieval result, selectively mapping the reference data to all or part of the virtual image region.

The step of mapping the reference data may comprise the steps of, where the result of the retrieval indicates that there is reference data, judging whether or not the reference data was updated within a predetermined time, and if the result of the judging indicates that the reference data was updated within a predetermined time, mapping the reference data to all or part of the virtual image region.

According to still another aspect of the present invention, an apparatus is provided for generating a virtual image region for motion compensation of a panorama image divided into tiled patch units and received at a receiving side, the apparatus comprising a retrieval unit for searching a previous panorama image for reference data corresponding to all or part of a virtual image region of a current patch desired to be motion-compensated in order to determine the presence of the reference data and retrieving such reference data if found, a judging unit for judging whether or not the reference data was updated within a predetermined time if the result of the retrieval of the retrieval unit indicates that there is reference data, a mapping unit for selectively mapping the reference data to all or part of the virtual image region if the result of the judging of the judging unit indicates that the reference data was updated within the predetermined time, and an additional information interpretation unit where, if the result of the judging by the judging unit indicates that the reference data was not updated within the predetermined time, for interpreting additional information received from the transmitting side, the information indicating whether the reference data is mapped to all or part of the virtual image region in the transmitting side, or whether pixels on the boundary part of a reference image in the previous panorama image corresponding to the position of the current patch are padded. The apparatus further comprises a padding unit for generating all or part of the virtual image region by padding pixels on the boundary part of a reference image in the previous panorama image corresponding to the position of the current patch if the result of the retrieval by the retrieval unit indicates that there is no reference data.

According to still another aspect of the present invention, a computer readable recording medium is provided having embodied thereon a computer program for executing a method of generating a virtual image region for motion estimation and motion compensation of a panorama image to be divided into tiled patch units and transmitted from a transmitting side, wherein the method comprises the steps of searching a previous panorama image for reference data corresponding to all or part of a virtual image region of a current patch desired to be motion-estimated and motion-compensated in order to determine the presence of the reference data and retrieving such reference data if found, and if the result of the retrieval indicates that there is reference data, judging whether or not the reference data was updated within a predetermined time, and if the result of the judging indicates that the reference data was updated within the predetermined time, mapping the reference data to all or part of the virtual image region.

According to still another aspect of the present invention, a method is provided for motion estimation of a panorama image to be divided into tiled patch units and transmitted from a transmitting side, the method comprising the steps of, where reference data corresponding to all or part of a virtual image region of a current patch desired to be motion-estimated is in the previous panorama image, mapping the reference data to all or part of the virtual image region, and by using all or part of the virtual image region on which the reference data is mapped, generating a motion vector of the current patch in relation to a reference image.

According to still another aspect of the present invention, a method is provided for encoding a panorama image to be divided into tiled patch units and transmitted from a transmitting side, the method comprising the steps of, where reference data corresponding to all or part of a virtual image region of a current patch desired to be motion-estimated is in the previous panorama image, mapping the reference data to all or part of the virtual image region, and by using all or part of the virtual image region on which the reference data is mapped, generating a motion vector of the current patch in relation to a reference image. The method further comprises the step of performing motion compensation for the current patch by using the motion vector.

According to still another aspect of the present invention, a method is provided for motion compensation of a panorama image divided into tiled patch units and received at a receiving side, the method comprising the steps of receiving an input of a motion vector for a current patch included in a current panorama image and if reference data indicated by the motion vector and corresponding to all or part of a virtual image region of the current patch is in the previous panorama image, mapping the reference data to all or part of the virtual image region, and by using all or part of the virtual image region on which the reference data is mapped, generating a patch of a reference image to which the motion vector is applied.

According to still another aspect of the present invention, a method is provided for motion compensation of a panorama image divided into tiled patch units and received at a receiving side, the method comprising the steps of receiving an input of a motion vector for a current patch included in a current panorama image and if reference data indicated by the motion vector and corresponding to all or part of a virtual image region of the current patch is in the previous panorama image, mapping the reference data to all or part of the virtual image region, and by using all or part of the virtual image region on which the reference data is mapped, performing motion compensation of a reference image. The method further comprises the step of restoring the current patch by using a differential signal of the current patch and the motion-compensated patch, and the motion-compensated patch.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF THE EXEMPLARY EMBODIMENTS

The present invention will now be described more fully with reference to the accompanying drawings, in which exemplary embodiments of the present invention are shown.

Figure 3:
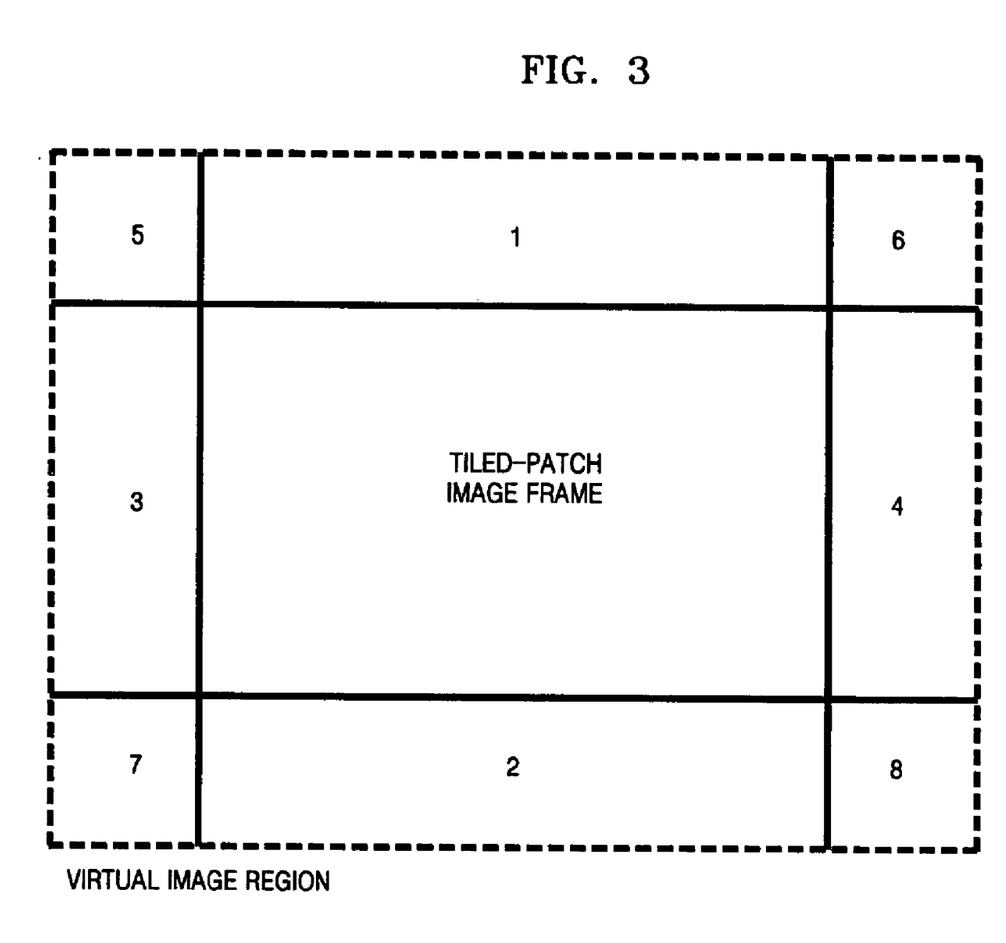
FIG. 3 illustrates a virtual image region of a tiled patch divided into 8 sections according to an embodiment of the present invention.

FIG. 3 illustrates a virtual image region of a tiled patch divided into 8 sections (numbered 1 through 8). According to an embodiment of the present invention, the entire panorama image is divided into tiled patches and therefore, with respect to the position of a patch, a method of generating a virtual image region can vary in each section. This will now be described in greater detail below.

Figures 4, 5A:
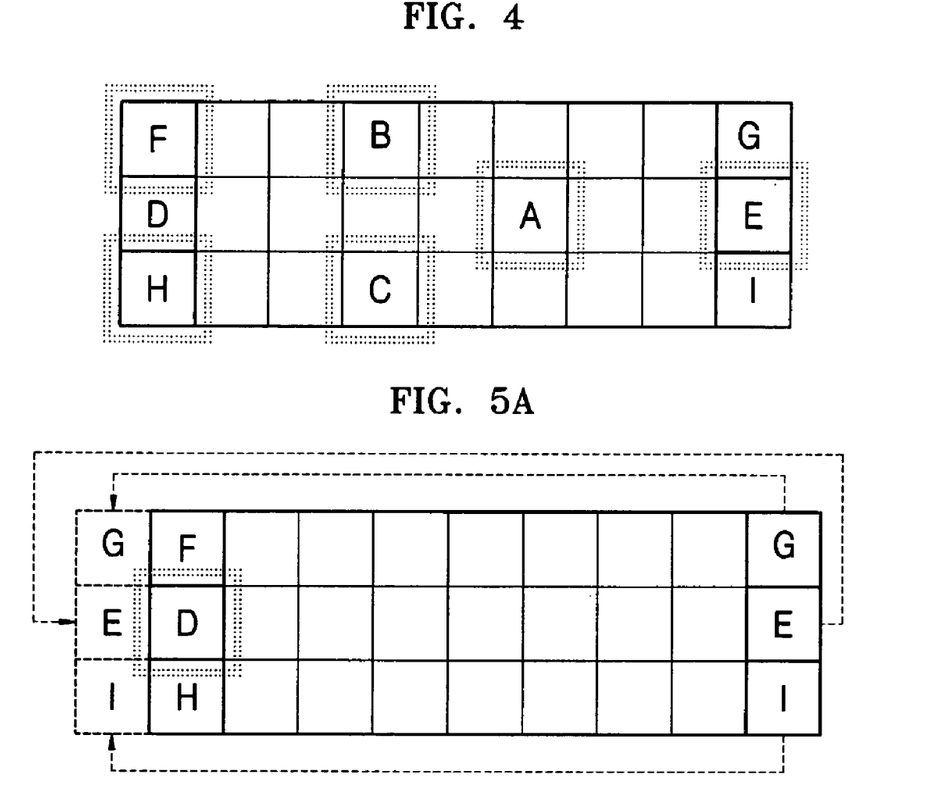
FIG. 4 illustrates a method of generating a virtual image region with respect to the location of a patch according to an embodiment of the present invention.
FIGS. 5A and 5B illustrate a method of generating a virtual image region when a patch desired to be coded is located on the leftmost edge or rightmost edge of a panorama image according to an embodiment of the present invention.

FIG. 4 illustrates a method of generating a virtual image region with respect to the location of a patch according to an embodiment of the present invention.

First, in a case of an internal patch as A, in which the position of the patch desired to be currently coded is not on an edge of a panorama image, if there is reference data recently updated in the region of the position corresponding to the patch in each section in a previous panorama image, the corresponding reference data is mapped to the corresponding section.

If the update of reference data was not performed recently, it can be determined whether padding with the boundary pixel value of a frame (hereinafter referred to as a 'reference patch') in the previous panorama image corresponding to the position identical to that of the patch desired to be currently coded is to be performed, or if the corresponding reference data is to be used instead. If a process of performing such a determination is included, it is preferable to generate additional information on the determination and transmit it to a receiving side, that is, a decoding side, so that the decoding side can set a substantially identical virtual region. This additional information will be described in greater detail below. Meanwhile, if there is no reference data, the corresponding section is generated by padding pixels on the boundary part of the reference patch.

Next, in a case where the position of a patch desired to be currently coded is located on the edge of the top part of the panorama image as B in relation to a virtual image region corresponding to sections 5 and 6 of FIG. 3, pixel value 128 is mapped to the corresponding region. For the remaining sections, a procedure substantially identical to that for generating a virtual image region in A is performed.

Also, for patches in other locations, the procedure described above is performed in substantially the same manner. However, in a case of patches F, D, H, G, E, and I, which are positioned on the leftmost or rightmost edge of the panorama image, respectively, a slightly different procedure can be performed in order to increase the motion estimation and compensation efficiencies. This procedure will now be described in greater detail.

FIG. 5A illustrates a method of generating a virtual image region when a patch desired to be coded is located on the leftmost edge of a panorama image according to an embodiment of the present invention.

In a case of patch D, since sections 3, 5, and 7 of FIG. 3 are on the outside of the panorama image, reference data for this does not exist.

However, according to the characteristics of a panorama image, D has high correlation with G, E, and I. Therefore, it is more efficient to generate the virtual image region for sections 5, 3, and 7, by referring to G, E, and I, respectively, of the previous panorama image, than by using padding unconditionally. That is, part of data of G is mapped to section 5 of the patch D, part of data of E to section 3, and part of data of I to section 7. However, if image data referred to in G, E, and I does not exist or was not updated recently, the algorithm described above will be used.

Figure 5B:
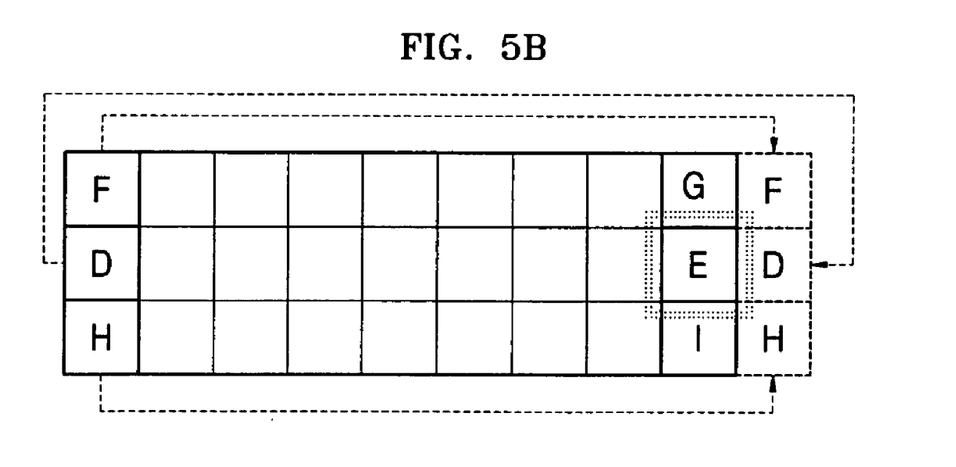

FIG. 5B illustrates a method of generating a virtual image region when a patch desired to be coded is located on the rightmost edge of a panorama image according to an embodiment of the present invention. In this case, F, D, and H of the previous panorama image are used for sections 6, 4, and 8, respectively, of the patch E in substantially the same manner.

Figure 6:
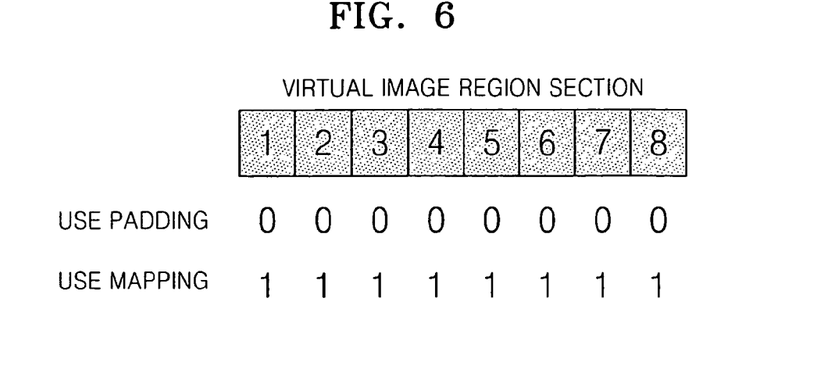
FIG. 6 illustrates additional information related to a method of generating a virtual image region according to an embodiment of the present invention.

FIG. 6 illustrates additional information related to a method of generating a virtual image region according to an embodiment of the present invention. As described above, although reference data exists, if it was not updated recently and has a low reliability, it is determined whether this reference data is to be used without change for mapping or whether a virtual image region is to be formed by padding data from a reference patch. According to the determination, mapping or padding is performed. Since a virtual region is also needed to be set in substantially the same manner at the receiving side, the transmitting side preferably needs to transmit information, on which the method is used for each section of a virtual image region, to the receiving side. When the virtual image region in relation to one patch is divided into 8 sections as in embodiments of the present embodiment, for this additional information, 8 bits are needed as shown in FIG. 6. If it is predefined between the transmitting side and the receiving side that a case using padding is indicated by 0 and a case using mapping with reference data is indicated by 1 as shown, a substantially identical virtual image region can be generated both in the transmitting side and the receiving side by transmitting the 8-bit additional information. For example, if the transmitting side uses reference data that has not been updated recently in sections 1, 4, and 6 without change, information "10010100" needs to be transmitted to the receiving side. If padding from a reference patch is performed, information "00000000" is transmitted, such that the receiving side can build a substantially identical virtual image region. Though the example of fixed length coding is shown in embodiments of the present embodiment, variable length coding using the probability distribution of information can also be used.

Figure 7:
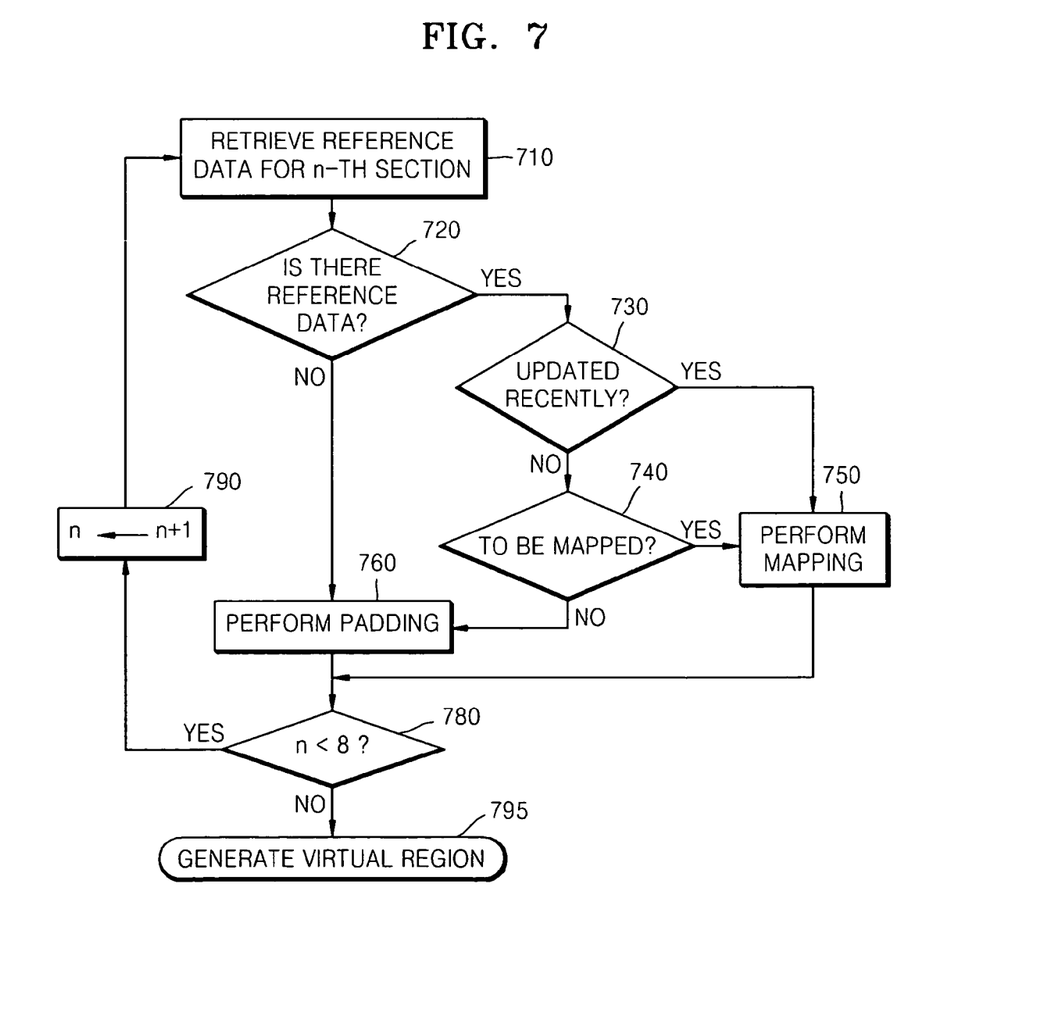
FIG. 7 is a flowchart of operations performed in an encoder by a method of generating a virtual image region according to an embodiment of the present invention.

FIG. 7 is a flowchart of operations performed in an encoder by a method of generating a virtual image region according to an embodiment of the present invention. As shown in FIG. 7, in order to determine whether or not there is reference data that can be referred to in the previous panorama image in relation to one section of a current patch desired to be motion-estimated, a search for and retrieval of the reference data is performed in operation 710. At this time, as described above, in a case of a patch positioned on the leftmost or rightmost edge of the panorama image, reference data can be retrieved from the image on the opposite edge. If there is reference data in operation 720, it is then determined whether or not the retrieved reference data was recently updated in operation 730. The reference time for determining whether the data has been recently updated or not can be set in a variety of ways. If it is determined that the data was recently updated, the reference data is mapped to the corresponding section in order to use the reference data as a virtual image region of the current patch in operation 750.

If the reference data was not recently updated, the reliability of the reference data is low and therefore, it is determined whether mapping is to be performed in order to use this reference data without change, or whether padding with pixels on the boundary part of the reference patch is to be performed in operation 740. If it is determined that mapping is to be performed, the corresponding reference data is mapped to the corresponding section in order to use the reference data as the virtual image region of the current patch in operation 750. If it is determined that padding is to be performed, padding with pixels on the boundary part of the reference patch is performed in operation 760 and a virtual image region is generated in operation 795. At this time, additional information on which the method is selected, is provided for synchronization of the encoder and decoder and can be generated as described above.

If there is no reference data, padding with pixels on the boundary part is performed in operation 760, such that a virtual image region is generated in operation 795.

This process is repeatedly performed for all sections in operation 780 and 790, and a virtual image region for one patch is generated in operation 795.

Figure 8:
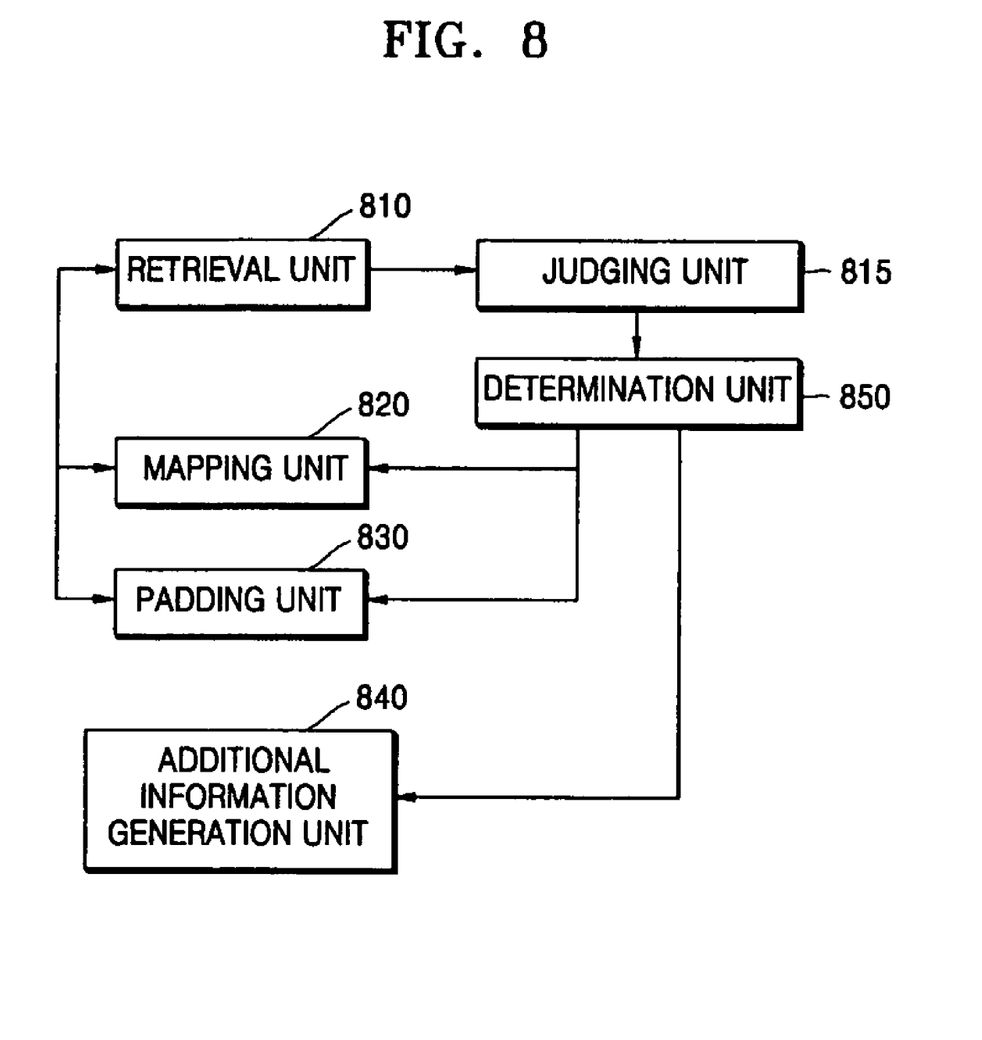
FIG. 8 is a block diagram of an apparatus disposed in an encoder for generating a virtual image region according to an embodiment of the present invention.

FIG. 8 is a block diagram of an apparatus disposed in an encoder for generating a virtual image region according to an embodiment of the present invention. As shown in FIG. 8, the apparatus for generating a virtual image region according to an embodiment of the present invention comprises a retrieval unit 810, a judging unit 815, a mapping unit 820, a padding unit 830, an additional information generation unit 840, and a determination unit 850.

In order to determine whether or not there is reference data in the previous panorama image corresponding to each section of a virtual image region of a current patch desired to be motion-estimated, the retrieval unit 810 searches for and retrieves the reference data and the mapping unit 820 maps the retrieved reference data to the corresponding section.

The judging unit 815 judges whether the retrieved data was updated recently, and the determination unit 850 determines whether mapping or padding is to be performed if the retrieved reference data was not recently updated. According to this determination, mapping or padding is performed. In order to also generate a virtual image region in a substantially identical method in a decoder, the additional information generation unit 840 generates information on which a method is used when a virtual image region is generated in a motion estimation process of the encoder.

If there is no reference data or if the determination unit 850 determines that padding is to be performed, the padding unit 830 pads pixels on the boundary part of a reference image corresponding to the location of the current patch in the previous panorama image such that a virtual image region is generated.

Figure 9:
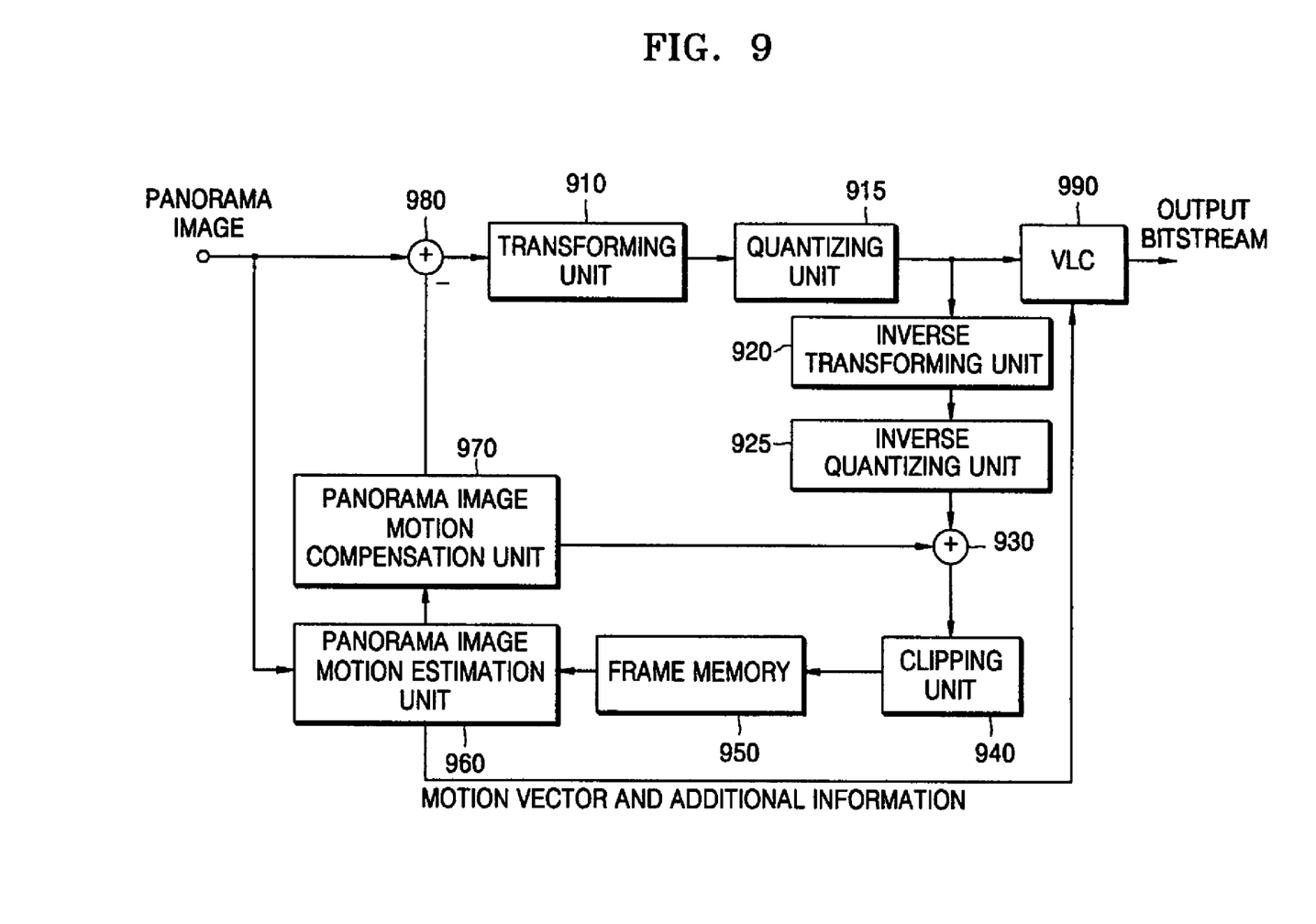
FIG. 9 is a block diagram of an encoder to which a virtual image region according to an embodiment of the present invention can be applied.

FIG. 9 is a block diagram of an encoder to which a virtual image region according to an embodiment of the present invention can be applied.

Referring to FIG. 9, the panorama image encoder according to an embodiment of the present invention comprises a transforming unit 910, a quantizing unit 915, an inverse transforming unit 920, an inverse quantizing unit 925, an adding unit 930, a clipping unit 940, a frame memory 950, a panorama image motion estimation unit 960, a panorama image motion compensation unit 970, a subtraction unit 980, and a variable length coder (VLC) 990.

The transforming unit 910 receives a panorama image, transforms the input panorama image according to a predetermined transforming method such as a discrete cosine transform (DCT), and outputs transform coefficient values.

The quantizing unit 915 quantizes the transform coefficient values input from the transforming unit 910. The quantized data is inverse transformed by the inverse transforming unit 920 and inverse quantized by the inverse quantizing unit 925, and data transmitted to the decoder end is output. This image data and the previous image motion-compensated in the panorama image motion compensation unit 970 are added in the adding unit 930, and the actual panorama image to be transmitted to the decoder side by the encoder is finally prepared. The panorama image output from the adding unit 930 is normalized by the clipping unit 940 and then stored in the frame memory 950. The panorama image stored in the frame memory 950 is an image previous to the currently encoded image, and is used as a reference image for motion estimation and compensation of the newly input panorama image.

The panorama image motion estimation unit 960 performs motion estimation using the reference panorama image of the previous image stored in the frame memory 950. That is, the panorama image motion estimation unit 960 receives current panorama image information, performs motion estimation of the current panorama image using the reference panorama image stored in the frame memory 950, generates the motion vector of the current panorama image and additional information according to embodiments of the present invention, and outputs the motion vector and additional information to the VLC 990. Motion estimation and compensation are performed in units of tiled patches.

Here, in order to generate a motion vector, a method of generating a virtual region according to embodiments of the present invention is used in the motion estimation operation. Accordingly, it is preferable that the apparatus shown in FIG. 8 is disposed in the panorama image motion estimation unit 960. The panorama image motion compensation unit 970 performs motion compensation by the motion vector and outputs the compensated image to the subtraction unit 980. The subtraction unit 980 outputs a differential signal between the current image and the image compensated by the panorama image motion compensation unit 970 to the transforming unit 910. The differential signal is transformed by the transforming unit 910 and quantized by the quantizing unit 915, and then variable-length-coded by the VLC 990.

Figure 10:
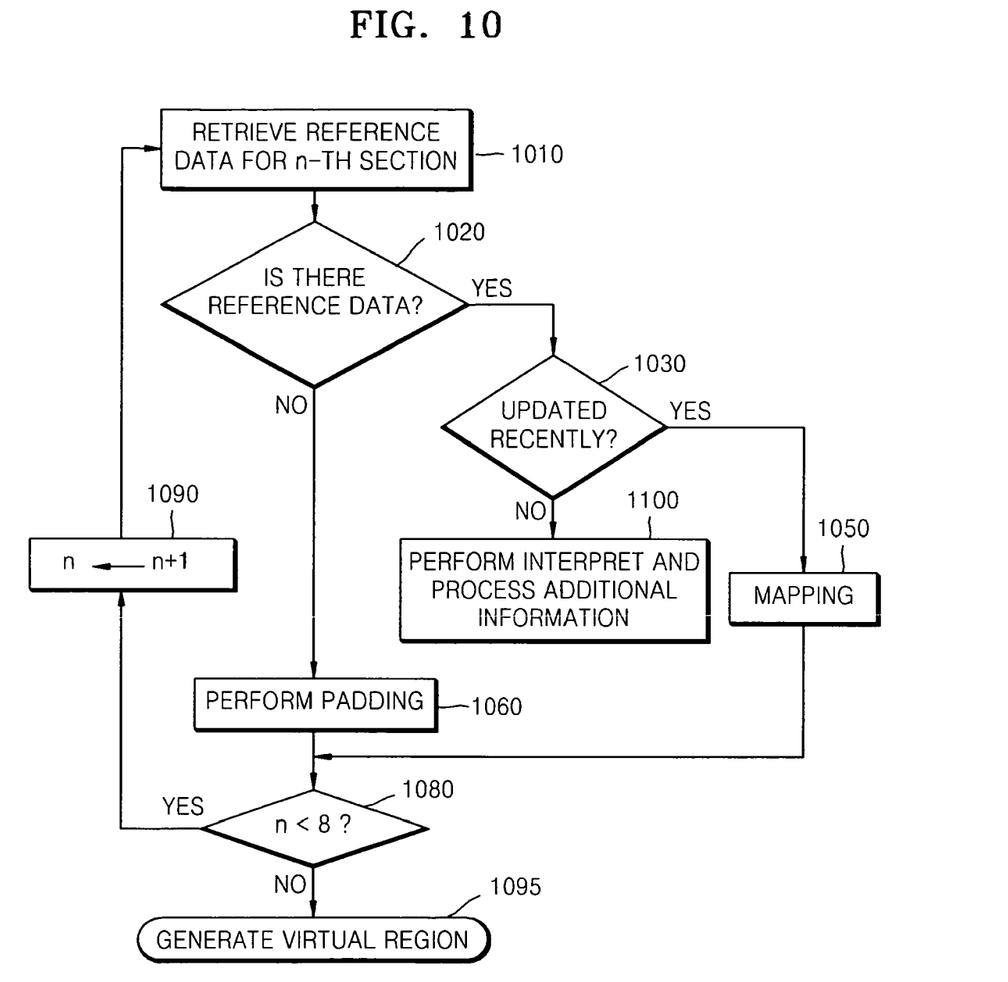
FIG. 10 is a flowchart of an operation performed in a decoder by a method of generating a virtual image region according to an embodiment of the present invention.

FIG. 10 is a flowchart of an operation performed in a decoder side by a method of generating a virtual image region according to an embodiment of the present invention.

In the decoder side, a motion vector, a differential signal, and additional information from an encoder side are received and motion compensation is performed. The process in operations 1010 through 1095 for generating a virtual image region to be performed for motion compensation is substantially the same as the process in operations 710 through 795 for generating a virtual image region performed in the encoder side, and therefore, a detailed explanation thereof will be omitted here.

However, when a case where retrieved reference data that was not recently updated is processed, in order to generate a virtual image region substantially identical to that generated in the encoder side, the additional information received from the encoder side is interpreted and according to the interpretation, mapping or padding is performed in each section in operation 1100.

Figure 11:
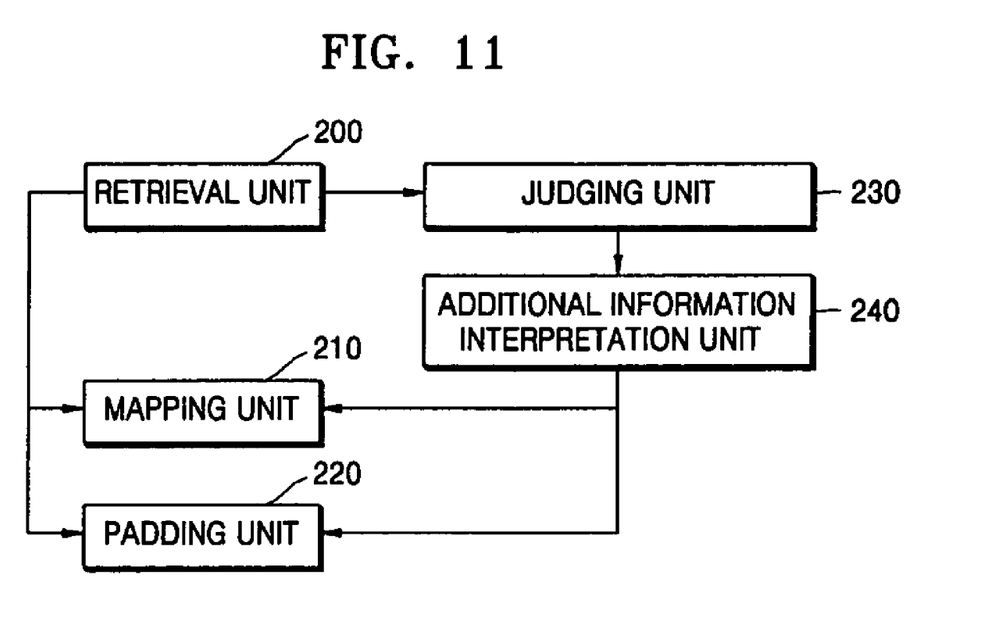
FIG. 11 is a block diagram of an apparatus disposed in a decoder for generating a virtual image region according to an embodiment of the present invention.

FIG. 11 is a block diagram of an apparatus disposed in a decoder for generating a virtual image region according to an embodiment of the present invention.

As shown in FIG. 11, the apparatus for generating a virtual image region according to an embodiment of the present invention comprises a retrieval unit 200, a mapping unit 210, a padding unit 220, a judging unit 230, and an additional information interpretation unit 240.

In order to determine whether or not there is reference data in the previous panorama image corresponding to each section of a virtual image region of a current patch desired to be motion-estimated, the retrieval unit 200 searches for and retrieves the reference data and the mapping unit 210 maps the retrieved reference data to the corresponding section. The judging unit 230 judges whether the retrieved data was updated recently, and if the retrieved reference data was not updated recently, in order to determine whether to perform mapping or padding, the additional information interpretation unit 240 interprets the additional information received from the encoder side. According to the contents recorded in the additional information, mapping or padding is performed for each section.

If there is no reference data or if the determination unit 850 of the decoder determines that padding is to be performed, the padding unit 220 pads pixels on the boundary part of a reference image corresponding to the location of the current patch in the previous panorama image such that a virtual image region is generated.

Figure 12:
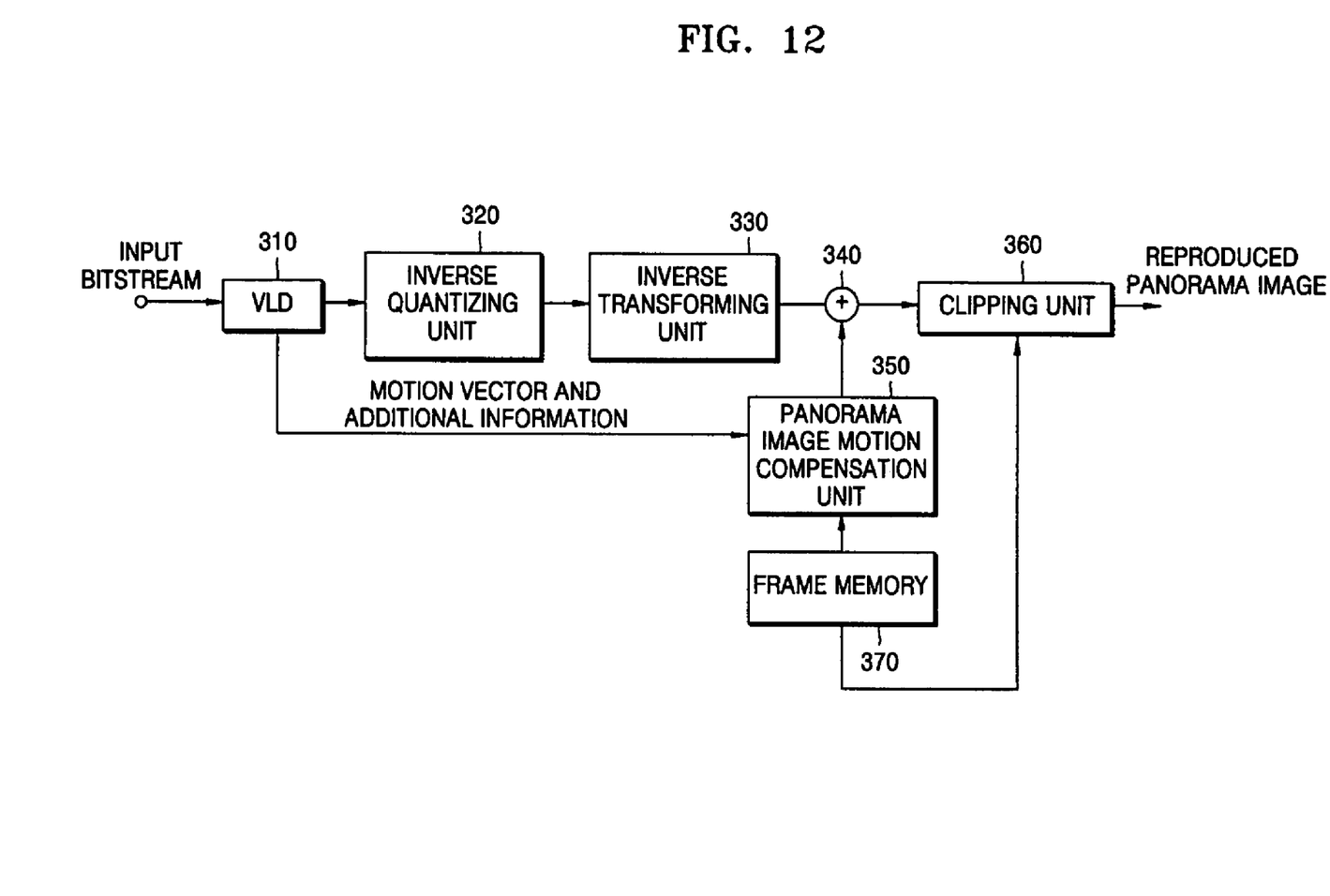
FIG. 12 is a block diagram of a decoder to which a virtual image region according to an embodiment of the present invention can be applied.

FIG. 12 is a block diagram of a decoder to which a virtual image region according to an embodiment of the present invention can be applied.

Referring to FIG. 12, the panorama image motion vector decoder according to an embodiment of the present invention comprises a variable length decoder (VLD) 310, an inverse quantizing unit 320, an inverse transforming unit 330, an adding unit 340, a panorama image motion compensation unit 350, a clipping unit 360, and a frame memory 370.

The VLD 310 variable-length-decodes an input bitstream. In the output of the VLD 310, a motion vector is output to the panorama image motion compensation unit 350, and a differential signal is output to the inverse quantizing unit 320. In the frame memory 370, a reference image is stored that is reproduced through the inverse quantizing unit 320, the inverse transforming unit 330, and the clipping unit 360. The reference image stored in the frame memory 370 is used for motion compensation of a newly input panorama image.

The panorama image motion compensation unit 350 performs motion compensation by using the reference panorama image stored in the frame memory 370. Here, in order to perform motion compensation, a method of generating a virtual image region according to an embodiment of the present invention is used. Accordingly, it is preferable that the apparatus shown in FIG. 11 is disposed in the panorama image motion compensation unit 350. The panorama image motion compensation unit 350 receives an input of the motion vector transmitted from the encoder, performs motion compensation by reading a reference patch corresponding to the current patch from the frame memory 370, and outputs the result to the adding unit 340. The adding unit 340 receives inputs of a differential signal inverse quantized by the inverse quantizing unit 320 and inverse transformed by the inverse transforming unit 330, and the reference patch motion-compensated by the panorama image motion compensation unit 350, and reproduces a current patch. The clipping unit 360 performs a function for normalizing the value output from the adding unit 340.

Embodiments of the present invention can be further written as computer programs and can be implemented in general-use digital computers that execute the programs using a computer readable recording medium. Examples of the computer readable recording medium comprise magnetic storage media (for example, ROM, floppy disk, hard disk, and the like), optical recording media (for example, CD-ROM or DVD), and storage media such as carrier waves (for example, transmission through the Internet).

According to embodiments of the present invention, a panorama image is divided into tiled patches and when the image is transmitted, data in the previous panorama image that can be referred to in relation to each patch is directly mapped onto a virtual region. By doing so, the panorama image containing omni-directional image information is coded by using a 2-dimensional moving picture coding method without change, while the coding efficiency in the process of motion estimation and compensation can be greatly improved.

While the present invention has been particularly shown and described with reference to exemplary embodiments thereof, it will be understood by those skilled in the art that various changes in form and detail may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of generating a virtual image region for motion estimation of a panorama image to be divided into tiled patch units and transmitted from a transmitting side, the method comprising the steps of:
    controlling a retrieval unit for searching a previous panorama image for reference data corresponding to all or part of a virtual image region of a current patch desired to be motion-estimated in order to determine the presence of the reference data and retrieving the reference data if found; and
    based on the retrieval result, controlling a mapping unit for selectively mapping the reference data to all or part of the virtual image region for image transmission from a transmitting side.

2. The method of claim 1, wherein the step of selectively mapping the reference data comprises the steps of:
    if the result of the retrieval indicates that there is reference data, controlling a judging unit for judging whether or not the reference data was updated within a predetermined time; and
    if the result of the judging indicates that the reference data was updated within a predetermined time, controlling the mapping unit for mapping the reference data to all or part of the virtual image region.

3. The method of claim 2, wherein the step of selectively mapping the reference data further comprises the steps of:
    if the result of the judging indicates that the reference data was not updated within the predetermined time, controlling a determination unit for determining whether mapping the reference data to all or part of the virtual image region is to be performed or if padding pixels on the boundary part of a reference image in the previous panorama image corresponding to the position of the current patch is to be performed; and
    controlling at least one of the mapping unit and a padding unit for performing mapping or padding according to the determination, respectively.

4. The method of claim 3, further comprising the step of:
    controlling an additional information generation unit for recording information on the determination in order to transmit additional information allowing a receiving side to substantially identically generate all or part of a virtual image region for the patch.

5. The method of claim 1, wherein the step of selectively mapping the reference data further comprises the step of:
    if the result of the search indicates that there is no reference data, controlling a padding unit for generating all or part of the virtual image region by padding pixels on the boundary part of a reference image in the previous panorama image corresponding to the position of the current patch.

6. The method of claim 1, further comprising the step of:
    if all or part of the virtual image region is outside any one of the left boundary and the right boundary of the previous panorama image, controlling the retrieval unit for recognizing an image from the other boundary to a predetermined range as reference data for a virtual image region part existing outside the one boundary.

7. An apparatus for generating a virtual image region for motion estimation of a panorama image to be divided into tiled patch units and transmitted from a transmitting side, the apparatus comprising:
    a retrieval unit for searching a previous panorama image for reference data corresponding to all or part of a virtual image region of a current patch desired to be motion-estimated in order to determine the presence of the reference data and retrieving the reference data if found; and
    a mapping unit for selectively mapping the reference data to all or part of the virtual image region based on the retrieval result.

8. The apparatus of claim 7, further comprising:
    a judging unit for judging whether or not the reference data was updated within a predetermined time if the retrieval result indicates that there is reference data, wherein if the result of the judging indicates that the reference data was updated within a predetermined time, the mapping unit performs the mapping.

9. The apparatus of claim 8, further comprising:
    a determination unit for determining whether mapping or padding is to be performed if the result of the judging indicates that the reference data was not updated within the predetermined time; and
    a padding unit for generating all or part of the virtual image region by padding pixels on the boundary part of a reference image in the previous panorama image corresponding to the position of the current patch if the retrieval result indicates that there is no reference data, wherein if the result of the judging indicates that the reference data was not updated within the predetermined time, the mapping or padding is performed according to the determination of the determination unit.

10. The apparatus of claim 9, further comprising:
    an additional information generation unit for recording information on the determination in order to transmit additional information allowing a receiving side to substantially identically generate all or part of a virtual image region for the patch.

11. The apparatus of claim 7, wherein if all or part of the virtual image region is outside any one of the left boundary and the right boundary of the previous panorama image, the retrieval unit is configured to recognize an image from the other boundary to a predetermined range as reference data for a virtual image region part existing outside the one boundary, and search for the reference data.

12. A method of generating a virtual image region for motion compensation of a panorama image divided into tiled patch units and received at a receiving side, the method comprising the steps of controlling a retrieval unit for searching a previous panorama image for reference data corresponding to all or part of a virtual image region of a current patch desired to be motion-compensated in order to determine the presence of the reference data; and based on the search result, controlling a mapping unit for selectively mapping the reference data to all or part of the virtual image region for image combination at a receiving side.

13. The method of claim 12, wherein the step of selectively mapping the reference data comprises the steps of:

if the result of the search indicates that there is reference data, controlling a judging unit for judging whether or not the reference data was updated within a predetermined time; and if the result of the judging indicates that the reference data was updated within a predetermined time, controlling the mapping unit for mapping the reference data to all or part of the virtual image region.

14. The method of claim 12, further comprising the steps of:

if the result of the judging indicates that the reference data was not updated within the predetermined time, controlling a determination unit for determining whether mapping the reference data to all or part of the virtual image region by referring to additional information received from the transmitting side is to be performed, or if padding pixels on the boundary part of a reference image in the previous panorama image corresponding to the position of the current patch is to be performed; and controlling at least one of the mapping unit and a padding unit for performing mapping or padding according to the determination, respectively.

15. An apparatus for generating a virtual image region for motion compensation of a panorama image divided into tiled patch units and received at a receiving side, the apparatus comprising:

a retrieval unit for searching a previous panorama image for reference data corresponding to all or part of a virtual image region of a current patch desired to be motion-compensated in order to determine the presence of the reference data and retrieving the reference data if found; and a mapping unit for selectively mapping the reference data to all or part of the virtual image region based on the retrieval result.

16. The apparatus of claim 15, further comprising:

a judging unit for judging whether or not the reference data was updated within a predetermined time if the retrieval result indicates that there is reference data, wherein if the result of the judging indicates that the reference data was updated within a predetermined time, the mapping unit performs the mapping.

17. The apparatus of claim 16, further comprising:

an additional information interpretation unit for, if the result of the judging by the judging unit indicates that the reference data was not updated within the predetermined time, interpreting additional information received from the transmitting side, wherein the information indicates whether the reference data is mapped to all or part of the virtual image region in the transmitting side or if pixels on the boundary part of a reference image in the previous panorama image corresponding to the position of the current patch are padded; and a padding unit for generating all or part of the virtual image region by padding pixels on the boundary part of a reference image in the previous panorama image corresponding to the position of the current patch if the retrieval result indicates that there is no reference data, wherein if the result of the judging by the judging unit indicates that the reference data was not updated within the predetermined time, the mapping or padding is performed according to the additional information.

18. A computer readable recording medium having embodied thereon a computer program for executing a method of generating a virtual image region for motion estimation and motion compensation of a panorama image to be divided into tiled patch units and transmitted from a transmitting side, wherein the computer readable recording medium comprises:

a first set of instructions for searching a previous panorama image for reference data corresponding to all or part of a virtual image region of a current patch desired to be motion-estimated and motion-compensated in order to determine the presence of the reference data and retrieving the reference data if found;

a second set of instructions for judging whether or not the reference data was updated within a predetermined time if the result of the retrieval indicates that there is reference data; and a third set of instructions for mapping the reference data to all or part of the virtual image region if the result of the judging indicates that the reference data was updated within the predetermined time.

19. A method of motion estimation of a panorama image to be divided into tiled patch units and transmitted from a transmitting side, the method comprising the steps of:

controlling a retrieval unit for determining if reference data corresponding to all or part of a virtual image region of a current patch desired to be motion-estimated is in a previous panorama image and controlling a mapping unit for mapping the reference data to all or part of the virtual image region;

controlling a motion estimation unit for performing a motion estimation of the current patch using a comparison with the reference data; and controlling the motion estimation unit for generating a motion vector of the current patch in relation to a reference image by using all or part of the virtual image region on which the reference data is mapped for image transmission from a transmitting side.

20. A method of encoding a panorama image to be divided into tiled patch units and transmitted from a transmitting side, the method comprising the steps of:

controlling a retrieval unit for determining if reference data corresponding to all or part of a virtual image region of a current patch desired to be motion-estimated is in a previous panorama image and controlling a mapping unit for mapping the reference data to all or part of the virtual image region;

controlling a motion estimation unit for generating a motion vector of the current patch in relation to a reference image by using all or part of the virtual image region on which the reference data is mapped and encoding data of at least the current patch and the motion vector of the motion estimation for transmission; and controlling a motion compensation unit for performing motion compensation for the current patch by using the motion vector for image transmission from a transmitting side.

21. A method of motion compensation of a panorama image divided into tiled patch units and received at a receiving side, the method comprising the steps of:

controlling a retrieval unit for receiving an input of a motion vector for a current patch included in a current panorama image;

controlling the retrieval unit for determining if reference data indicated by the motion vector and corresponding to all or part of a virtual image region of the current patch is in the previous panorama image; and controlling a mapping unit for mapping the reference data to all or part of the virtual image region by applying the motion vector to all or part of the virtual image region on which the reference data is mapped to provide motion compensation for image combination at a receiving side.

22. A method of motion compensation of a panorama image divided into tiled patch units and received at a receiving side, the method comprising the steps of:

controlling a retrieval unit for receiving an input of a motion vector for a current patch included in a current panorama image;

controlling the retrieval unit for determining if reference data indicated by the motion vector and corresponding to all or part of a virtual image region of the current patch is in the previous panorama image;

controlling a mapping unit for mapping the reference data to all or part of the virtual image region;

controlling a motion compensation unit for performing motion compensation of a reference image by using all or part of the virtual image region on which the reference data is mapped; and controlling a clipping unit for restoring the current patch by using a differential signal of the current patch and the motion-compensated patch, and the motion-compensated patch for image combination at a receiving side.

* * * * *